Figure 1:
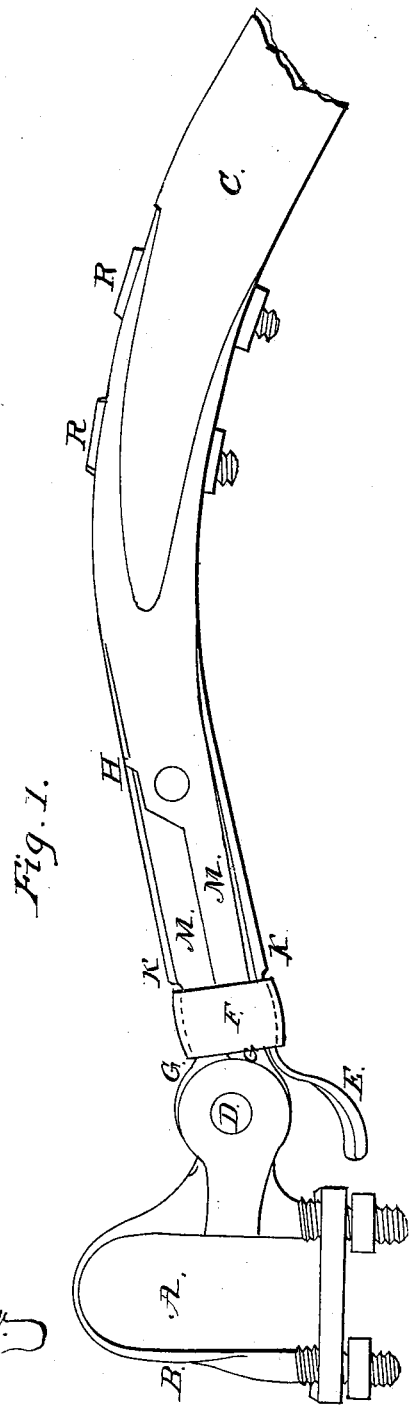

2 Sheets—Sheet 1

J. SADLER.
Thill-Coupling.

No. 29,317.

Patented July 24, 1860

WITNESSES:

INVENTOR:

2 Sheets—Sheet 2.
J. SADLER.
Thill-Coupling
No. 29,317. Patented July 24, 1860.
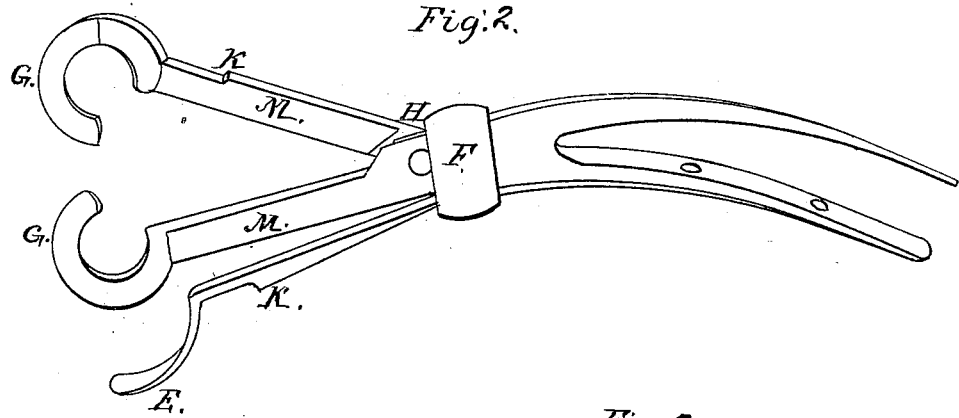
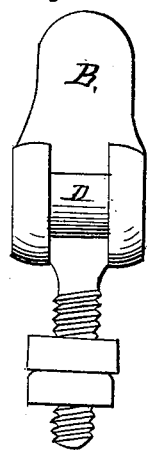
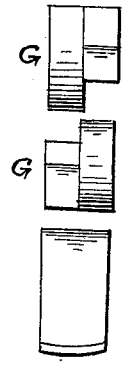
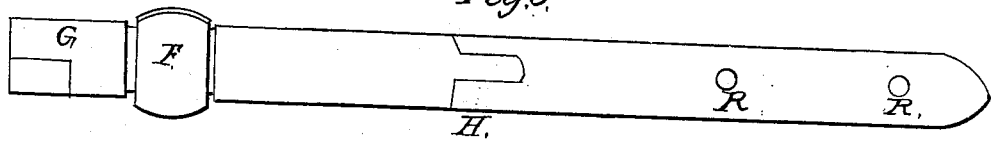
WITNESSES:
INVENTOR:
James Leclen

UNITED STATES PATENT OFFICE.

JAMES SADLER, OF EGREMONT, MASSACHUSETTS.

COUPLING FOR THILLS TO AXLES.

Specification of Letters Patent No. 29,317, dated July 24, 1860.

*To all whom it may concern:*

Be it known that I, JAMES SADLER, of Egremont, in the county of Berkshire and State of Massachusetts, have invented a new and useful Spring-Coupling for Connecting the Shafts or Pole of a Single or Double Carriage to the Forward Axle; and I do hereby declare that the following is a full and exact description thereof and of the construction and operation of the same, reference being had to the accompanying drawings, and the letters of reference thereon, making a part of this specification.

Figure 1, represents a lateral view of my coupling, (which may be of iron or steel) as it appears when applied to the vehicle, A, representing the space through which the carriage axle passes, encircled by the band B, and C representing the part of the wooden shaft or pole, secured to the coupling by bolts R, R. D, is extremity of a permanent iron bolt, (represented in another view in Fig. 4,) encircled by G, G, the clasps, which are represented in Figs. 2 and 5.

H, in Figs. 1, 2, and 3, is a dividing joint. E, in Figs. 1 and 2, represents thumb-piece of a spring, over which as also the arms M, M, the movable slide or band F passes, and is kept in place by the spring, and by the shoulders K, K. A pressure upward upon the spring at E, allows the slide F to be moved, so that the coupling may be unclasped from the bolt D.

The nature of my invention consists in the substitution of a permanent iron bolt in place of the movable one ordinarily kept in place by a common screw and nut, and ordinarily used to connect the shafts or pole of a carriage to the band and clip attached to the axle, and in the application to such permanent bolt of a pair of hooked clasps, contrived to shut over and encircle the bolt, (allowing sufficient play merely for the raising and lowering of the pole or shafts), and kept in place by a band and spring, by means of which the whole may be securely held, or if desired, may be readily detached.

This device is susceptible of adaptation to any one horse or two horse carriage or wheel vehicle drawn by horse; it avoids the rattling and insecurity which the movable bolt fastened by screw and nut is liable to; it is more durable, safer, and can be applied or removed with perfect facility, by use of the spring, clasp or slide.

I claim as my invention and desire to secure by Letters Patent:

The application to the bolt connecting the shafts or pole of a carriage with the band or clip attached to the axle, of a pair of hooked clasps, contrived to shut over and encircle such bolt, which bolt may be permanent, (allowing sufficient play merely for the raising and lowering of the shafts or pole, wherewith said clasps are permanently connected) and kept in place by a band and spring, by means of which the whole may be securely held, or, if desired, may be readily detached.

JAMES SADLER.

Witnesses:
SAM B. SUMNER,
W. J. KARNER.